United States Patent [19]

Fischer et al.

[11] Patent Number: 5,545,084

[45] Date of Patent: Aug. 13, 1996

[54] METHOD AND APPARATUS FOR AIR CONDITIONING TWO PASSENGER DECKS OF AN AIRCRAFT

[75] Inventors: Heinz Fischer, Henstedt-Ulzburg; Thomas Scherer, Hamburg; Michael Markwart, Halstenbek; Klaus Petry, Hamburg, all of Germany

[73] Assignee: Daimier-Benz Aerospace Airbus GmbH, Hamburg, Germany

[21] Appl. No.: 504,906

[22] Filed: Jul. 20, 1995

[30] Foreign Application Priority Data

Jul. 21, 1994 [DE] Germany ........................... 44 25 871.2

[51] Int. Cl.⁶ ..................................................... B64D 13/08
[52] U.S. Cl. ..................... 454/76; 62/86; 62/412
[58] Field of Search ................................ 454/71, 73, 74, 454/76; 62/86, 412; 244/118.5

[56] References Cited

U.S. PATENT DOCUMENTS

| 4,066,227 | 1/1978 | Buchsel .................................. 244/118.6 |
| 4,742,760 | 5/1988 | Horstman et al. ......................... 454/76 |
| 5,479,983 | 1/1996 | Fischer et al. ..................... 244/118.5 X |

FOREIGN PATENT DOCUMENTS 0382604  8/1990  European Pat. Off. ................. 454/76

*Primary Examiner*—Harold Joyce
*Attorney, Agent, or Firm*—W. G. Fasse; W. F. Fasse

[57] ABSTRACT

A method and apparatus is provided for air conditioning two passenger decks in an aircraft, especially a high capacity aircraft. The engine tap air stream is provided for air conditioning the upper deck passenger cabin and the lower deck passenger cabin. The air stream is cooled in at least one air conditioning plant, mixed with recirculated air from the lower cabin in at least one premix chamber, and then mixed with recirculated air from the upper cabin in local mixing chambers. The finished air streams are directed to the upper deck and the lower deck passenger cabins. The upper deck exhaust air is essentially completely used as recirculation air being mixed with the conditioning air in the local mixing chambers. The lower deck exhaust air is partially used as recirculation air being mixed with the conditioning air in the premix chambers, and is partially exhausted overboard. The desired air temperature, quality, and quantity can thus be achieved independently in the two passenger cabins, in an energy efficient and space-saving manner.

21 Claims, 2 Drawing Sheets

METHOD AND APPARATUS FOR AIR CONDITIONING TWO PASSENGER DECKS OF AN AIRCRAFT

FIELD OF THE INVENTION

The invention relates to a method and an apparatus for climate controlling or air conditioning two passenger decks of a multi-deck aircraft, especially a high capacity aircraft.

BACKGROUND INFORMATION

Passenger cabins of present aircraft are normally air conditioned by using compressed air taken from the compressor stages of the main engines or the auxiliary engine and then cooled in air cycle cooling packs. This fresh air is mixed with filtered cabin exhaust air, which is drawn by blowers from the underfloor space. Then the mixed airstream is directed into the conditioned air distributor ducts. Such a mixing and distribution system is described in French Patent Publication 2,642,724 for a one passenger deck aircraft. Furthermore it is known, that carbon dioxide removal from the recirculation air is proposed as a future potential for further compressed air reduction.

In contrast to conventional aircraft to date, future high capacity aircraft will comprise two passenger decks that extend the entire length of the aircraft and that are interconnected by stairways. If the presently known air conditioning systems as described above, using one centralized air conditioning station in the underfloor area, were to be adapted to such a two deck aircraft, the result would require transporting great air quantities over long distances, requiring space consuming duct systems. Furthermore, it must be avoided, that used air from the upper deck enters the lower deck through the stairways, causing uncomfortable drafts and a degradation of air quality in the lower deck. Furthermore, the capability of modern engines with high bypass ratio to supply high bleed air quantities at high pressures is reduced. A reduction of the compressed air demand from the engines is therefore required for such a high capacity aircraft below that of present aircraft. Moreover, a comfort problem exists in present aircraft during heating cases, where the warm air is blown into the cabin only at ceiling level, causing uncomfortable low floor temperatures.

OBJECTS OF THE INVENTION

In view of the above it is the aim of the invention to achieve the following objects singly or in combination:

- to provide a method and an apparatus for air conditioning the two passenger decks of a high capacity aircraft in an energy efficient and space-saving manner;
- to provide a method and an apparatus to achieve a balanced air delivery and air extraction in the upper passenger deck, to avoid that used air from the upper deck enters the lower deck;
- to provide a method and apparatus to reduce the bleed air quantity taken from the engine compressors and to reduce the bleed pressure demand;
- to provide a method and apparatus to improve the cabin comfort by avoiding a high temperature stratification during heating cases; and
- to provide a method and apparatus that can achieve the required air temperature, quality and quantity for each of the passenger decks independently.

SUMMARY OF THE INVENTION

These objects have been achieved in a system comprising the following:

- A decentralized air supply system consisting of two air conditioning and air reprocessing equipment packages, located in the underfloor area below the lower deck, forward and aft of the wing, and various local recirculation and mixing packages between the two passenger decks.
- Means to collect the entire quantity of cabin exhaust air from the upper deck at floor level and recirculate it into the local mixing chambers at cabin level.
- Integration of air reprocessing equipment into the system to convert used air extracted from the lower passenger deck to quasi fresh air in order to substantially reduce the bleed air quantity taken from the engine compressors.
- Use of vapor cycle cooling plants in addition to air cycle cooling plants in order to provide cooling performance converted from electrical energy instead of from bleed air pressure.
- Introduction of recirculation air cooling by use of fluid/air heat exchangers in the local recirculation circuits, in order to cool the recirculation air from the upper deck before passing it into the local mixer units. Cooling power is carried by a cooling fluid from the vapor cycle cooling plants to the local heat exchangers.
- Installation of additional air outlets at floor level, beside the air outlets in the ceiling area, to blow some warm air into the foot area during heating operation.
- Supply of separate air conditioning air streams for the upper and lower deck, which are preconditioned for the different temperature requirements in the upper and lower deck.

BRIEF DESCRIPTION OF THE DRAWING

In order that the invention may be clearly understood, it will now be described, by way of example, with reference to the accompanying drawing FIGS. 1 and 2, which are schematic circuit diagrams of two embodiments of an air conditioning system according to the invention as it applies to a two-deck passenger aircraft.

DETAILED DESCRIPTION OF PREFERRED EXAMPLE EMBODIMENTS AND OF THE BEST MODE OF THE INVENTION

Figure 1:
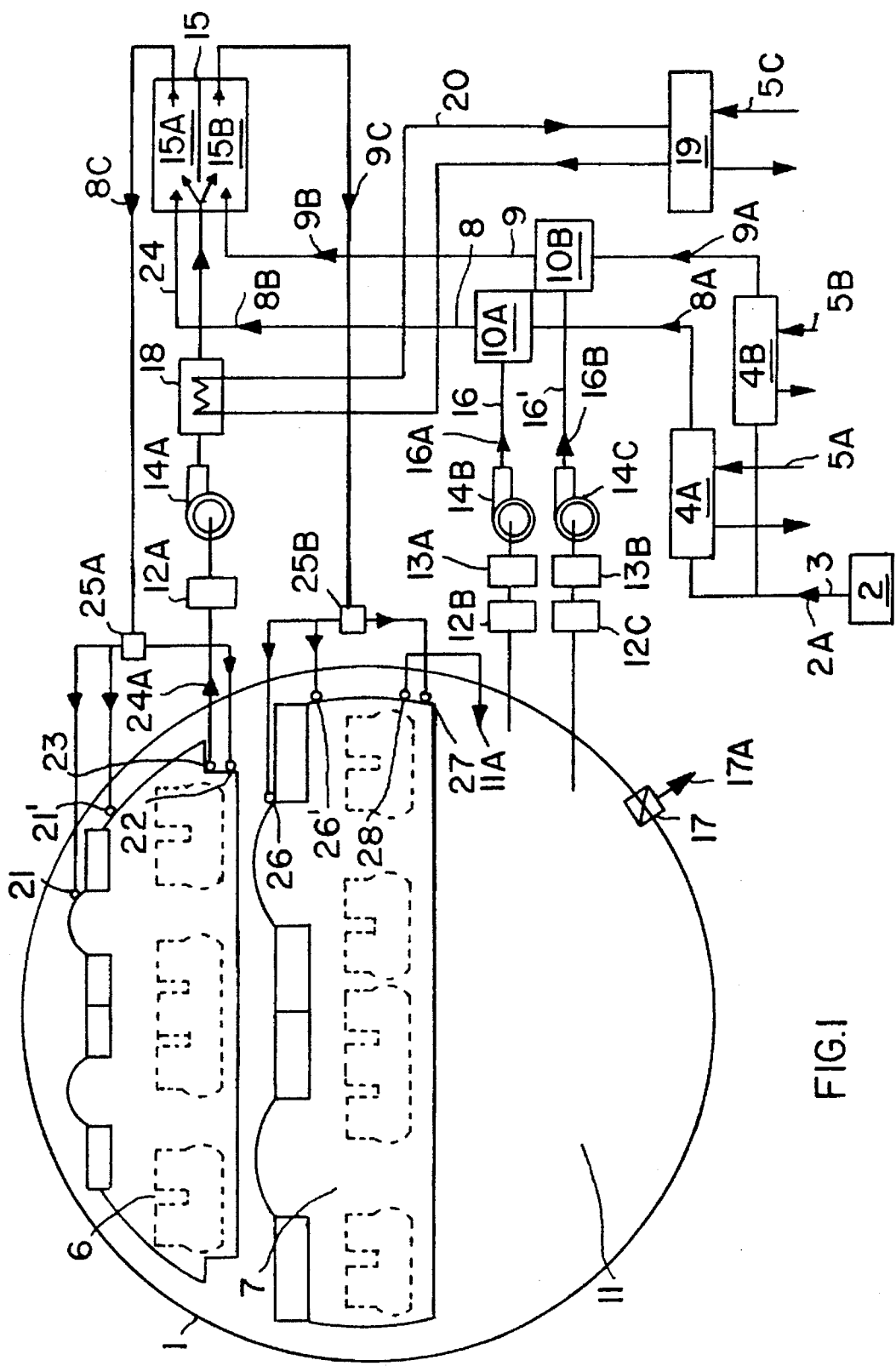
FIG. 1 shows a general schematic overview of an air conditioning system for a multi-deck aircraft 1. The aircraft 1 includes two passenger decks with respective passenger cabins arranged therein, namely an upper passenger cabin in the upper deck 6 and a lower passenger cabin or main passenger cabin in the lower or main deck 7.

The air conditioning system must ensure that each passenger cabin is provided with air at the correct pressure, the desired temperature, and the required air quality. Generally, different heat loads exist in the upper deck 6 and the lower deck 7, so that the conditioned air introduced into each passenger cabin preferably has a different inlet temperature. This is achieved according to the invention by providing separate preconditioning air streams for the two cabins. Moreover, the passenger cabin on each deck can be further divided into several temperature zones along the length of the aircraft, whereby each zone has its own independent temperature fine trim control. Thus, in addition to the air flow circuits shown in FIG. 1, further local air flow circuits can be provided along the length of the aircraft with a corresponding air distribution system for each deck, in order to independently air condition each separate zone of the passenger cabins 6 and 7.

Compressed air 2A is provided to the air conditioning system from the jet engine compressors 2 or auxiliary engine compressors, i.e. so-called tap air, or from any other compressor apparatus. In order to minimize the required amount of fresh compressed air 2A, cabin recirculation air 24A out of the upper deck circuit and cabin recirculation air 16A and 16B out of the lower deck circuit are mixed with the fresh compressed air 2A. The local upper floor cabin air recirculation provides a recirculation percentage comparable with present aircraft. In order to further reduce the amount of required fresh compressed air, also a portion of the air extracted from the lower deck is recirculated and added to the fresh air in the premix chambers 10A and 10B. However, to keep the air quality standard in the passenger cabin, this latter recirculation air is passed through air reprocessing equipment, such as particle and odor filters 12B/C and carbon dioxide strippers 13A/B.

A particular example embodiment, according to the invention, of an air conditioning system for a multi-deck aircraft 1 is constructed as follows. Tap air 2A from a compressed air source such as the main jet engines 2 is delivered through a two-branched compressed air duct 3 to a first air conditioning plant or unit 4A for an upper deck air circuit and to a second air conditioning plant or unit 4B for a lower deck air circuit, whereby the tap air 2A is cooled in the two air conditioning plants 4A and 4B. Outside air ducts 5A and 5B respectively connect the air conditioning plants 4A and 4B to the outside environment, in order to reject the heat from the hot tap air 2A to the cool outside air during operation.

A first air distributor duct 8 for a first conditioned air stream 8A extends from the first air conditioning plant 4A to the upper cabin 6. A second air distributor duct 9 for a second conditioned air stream 9A extends from the second air conditioning plant 4B to the lower cabin 7. The first air conditioning plant 4A is connected to a first premix chamber 10A by the air distributor duct 8. The second air conditioning plant 4B is connected to a second premix chamber 10B by the second air distributor duct 9. The two air conditioning plants 4A and 4B and the air preparation means of the premix chambers 10A and 10B are arranged in the below-deck area 11, preferably with one air conditioning plant arranged in front of the wing and one air conditioning plant arranged behind the wing. The spatially separated arrangement of the air conditioning plants 4A and 4B and the premix chambers 10A and 10B allows the components to be arranged to make the most efficient use of any space available in the aircraft. Furthermore, the separation of the air conditioning plant 4A and 4B, the air ducts 3, 8 and 9, and the premix chambers 10A and 10B into two separate air flow circuits considerably increases the reliability of the system, because conditioned air can still be supplied even in the event that a component fails in one of the air flow circuits.

As described in greater detail below, recirculation ducts 16 and 16' deliver respective cabin recirculation air streams into the premix chambers 10A and 10B, where the recirculation air streams are respectively mixed with the conditioned air 8A and 9A. From the output of the premix chambers 10A and 10B, the air distributor ducts 8 and 9 deliver the premixed conditioned air streams 8B and 9B respectively to two local mixing chambers 15A and 15B. Cabin exhaust air from the upper deck passenger cabin 6 is substantially completely recirculated by being mixed with the air streams 8B and 9B in the mixing chambers 15A and 15B as follows. A cabin exhaust/recirculation air duct 24 carries exhaust/recirculation air 24A from the upper passenger cabin 6 through recirculation devices, which are known as such, and then into the local mixing chambers 15A and 15B. For example, as described further below, the air 24A is filtered through a micro-filter 12A and conveyed by a recirculation blower 14A as repro reprocessed recirculation air 24A to be mixed with the conditioned air 8B and 9B.

In the present embodiment, the two local mixing chambers 15A and 15B are consolidated to form a single local mixing unit 15 having two chambers A and B that are interconnected, but are respectively provided for the two separate conditioned air streams 8B and 9B, whereby the recirculation air stream 24A can be apportioned between and intermixed with the two conditioned air streams 8B and 9B depending on the particular requirements at hand. Furthermore, this embodiment allows the two air conditioning circuits to be interconnected if one of the circuits fails.

The local mixing unit 15 is preferably arranged in the area between the lower cabin 7 and the upper cabin 6. By such an arrangement, the number and length of the required air ducts is considerably reduced. Several of such local mixing units 15 can be arranged along the length of the aircraft.

Two or more recirculation air fans 14A and filters 12A are arranged in upper deck exhaust/recirculation air ducts 241. The filters are to remove particles, bacteria, and remaining odors from the cabin exhaust air 24A that is to be recirculated. The recirculation blowers 14A are regulated to suck essentially all of the air conditioning exhaust air out of the upper deck passenger cabin 6, in order to avoid that used air from the upper deck enters the lower deck and that vertical drafts occur through the stairways between the upper and lower decks. In other words, air is removed from the upper cabin 6 through the recirculation duct 24 at substantially the same rate that air is introduced into the upper cabin 6.

In order to cool the recirculation air 24A if necessary, a recirculation heat exchanger 18 is arranged in the air duct 24 upstream of each local mixing chamber. Coolant conduits 20 connect the heat exchanger 18 to a cooling plant 19, preferably a vapor cycle pack, which is known as such in the art. The coolant, for example a glycol cooling medium, flows through the coolant conduits 20 to be cooled by the cooling plant 19 and then returned to the heat exchanger 18, where it absorbs excess heat from the recirculation air 24A. As said before, the upper deck and lower deck cabins can be divided into several independently controlled temperature zones. The supply air 8B and 9B is already preconditioned for each deck. Fine trimming can be accomplished by introduction of small hot air quantities into the conditioned air supply ducts 8 and 9 to each zone, as known in the art, through respective trim air control valves. As an alternative solution according to the invention, temperature trimming can be obtained by using one local heat exchanger in each conditioned air supply duct 8 and 9 to each zone and by varying the cooling performance through respective control valves in each cooling fluid supply line. Another alternative for fine trimming, according to the invention, is to use electric heaters in each conditioned air supply duct to each zone.

Thus, the separate conditioned air streams 8B and 9B are each mixed with a portion of the upper cabin recirculation air 24A in the local mixing chambers 15A and 15B respectively, to form output conditioned air streams 8C and 9C respectively, which are then delivered to the upper cabin 6 and the lower cabin 7. More particularly, the output ends of the local mixing chambers 15A and 15B are respectively connected through control valves 25A and 25B to ceiling air inlets 21, 21' and floor air inlets 22 in the upper deck passenger cabin 6, and ceiling air inlets 26, 26' and floor air inlets 27 in the lower deck passenger cabin 7. The control valves 25A and 25B apportion the flow of conditioned air 8C and 9C for each cabin respectively between the ceiling air inlets 21 and 21' or 26 and 26' on the one hand, and the floor air inlets 22 and 27 on the other hand. The major portion of the conditioned air streams 8C and 9C is delivered to the air inlets provided near the ceiling, and only a small portion of the air is provided to the air inlets mounted near the floor. The air inlets near the floor 22 and 27 are especially provided to provide auxiliary heating near the floor as required to increase the comfort of the passengers. The respective apportionment or distribution of the air flow is controlled by the valves as required in each situation.

Air outlets 23, preferably arranged near the floor of the upper cabin 6, allow exhaust air to be removed from the upper cabin 6 into the exhaust/recirculation air duct 24A as described above. Air outlets 28, preferably arranged near the floor of the lower cabin 7, allow exhaust air 11A to be removed from the lower passenger cabin 7 into the below-deck space 11, which is provided and adapted for that purpose. In the upper deck circuit, essentially the entire volume of the cabin exhaust air 24A is used as recirculation air that is filtered and introduced into the local chambers 15A and 15B of the local mixing unit 15 as described above. On the other hand, the exhaust air 11A from the lower cabin 7 is partially reprocessed, and recirculated and partially exhausted overboard. More specifically, two recirculation air streams 16A and 16B are removed from the below-deck space 11, and an exhaust air stream 17A is ejected overboard through a pressure regulating valve 17.

The portion of the cabin exhaust air 11A that is to be used as recirculation air 16A and 16B is blown through respective recirculation ducts 16 and 16' by respective blowers 14B and 14C, filtered by respective particulate and odor filters 12B and 12C, and additionally processed through respective $CO_2$ strippers 13A and 13B as described above. The processed recirculated air streams are then delivered through the recirculation ducts 16 and 16' into the corresponding premix chambers 10A and 10B to be mixed with and increase the volume of the conditioned air streams 8A and 9A.

Figure 2:
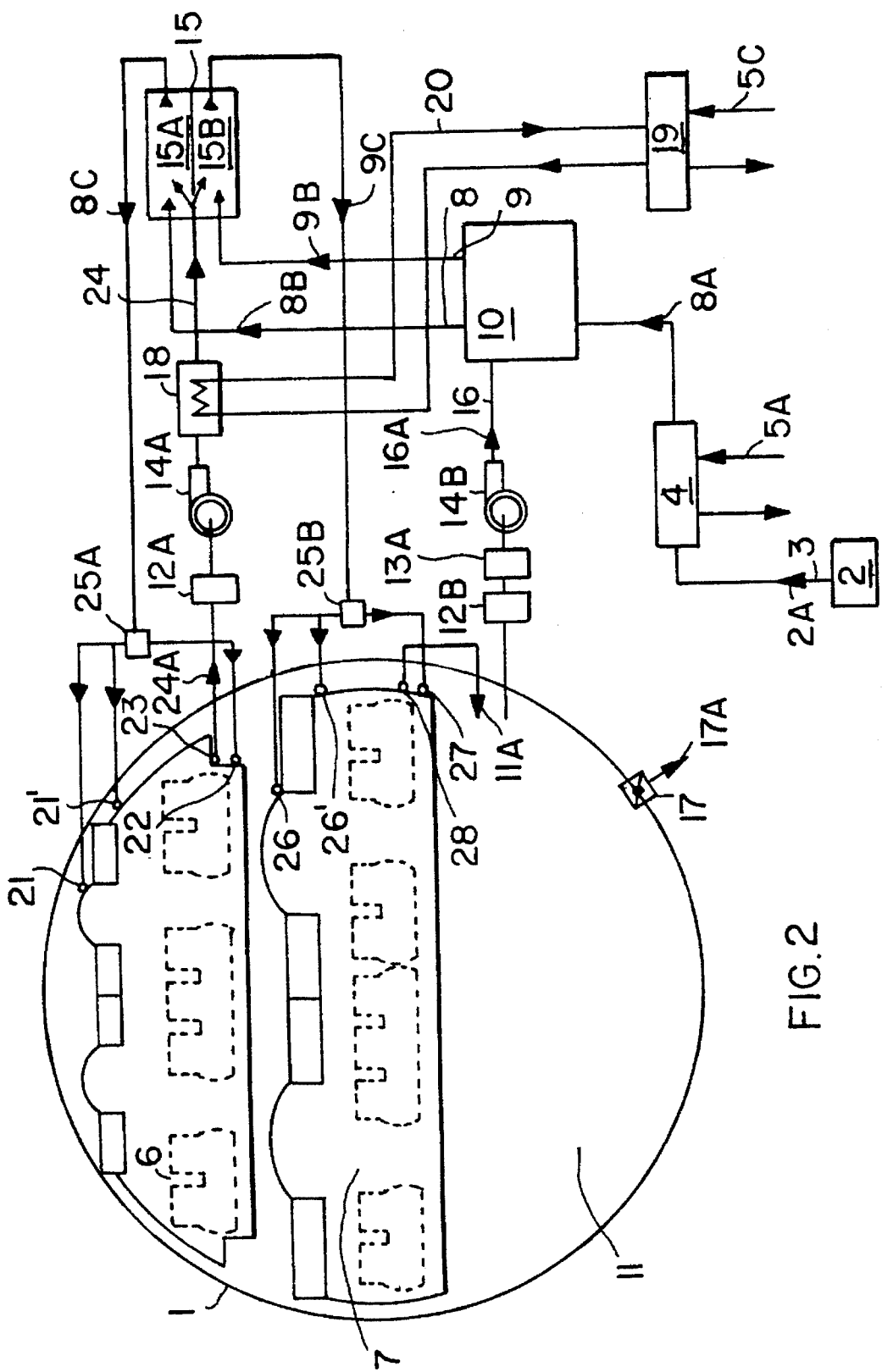

Another example embodiment is shown in FIG. 2 which uses only one air conditioning plant 4 delivering a stream of air 8A to one premix chamber 10. The cooling plant may also be composed of several cooling devices operating in parallel for redundancy reasons.

The rest of the system is identical to the example shown in FIG. 1.

Although the invention has been described with reference to specific example embodiments, it will be appreciated that it is intended to cover all modifications and equivalents within the scope of the appended claims.

What is claimed is:

1. A method of air conditioning an upper deck passenger cabin and a lower deck passenger cabin in a two passenger deck aircraft, comprising:

a) providing at least one compressed air stream;

b) cooling said compressed air stream in at least one air conditioning plant;

c) extracting a lower cabin exhaust air stream from said lower deck passenger cabin and mixing a recirculation portion of said lower cabin exhaust air stream into said compressed air stream to result in at least one first and one second supply air stream;

d) extracting an upper cabin recirculation air stream from said upper deck passenger cabin and mixing said upper cabin recirculation air stream into said first and second supply air streams;

e) directing said first supply air stream into said upper deck passenger cabin with a flow rate substantially equivalent to a flow rate of said upper cabin recirculation air stream;

f) directing said second supply air stream into said lower deck passenger cabin; and g) ejecting an exhaust portion of said lower cabin exhaust air stream outside said aircraft.

2. The method of claim 1, wherein said step c) comprises extracting said lower cabin exhaust air stream from said lower deck passenger cabin through a below-deck space of said aircraft.

3. The method of claim 1, wherein said step c) comprises mixing two independent recirculation portions of said lower cabin exhaust air stream respectively into said first and second supply air streams.

4. The method of claim 1, wherein said step d) comprises extracting said upper cabin recirculation air stream directly from said upper deck passenger cabin, and selectively apportioning said upper cabin recirculation air stream between a first recirculation portion which is mixed into said first compressed air stream and a second recirculation portion which is mixed into said second compressed air stream.

5. The method of claim 1, wherein said step a) comprises providing tap air from at least one engine of said aircraft for said compressed air stream.

6. The method of claim 1, wherein said step d) comprises blowing said upper cabin recirculation air stream with a blower and passing said upper cabin recirculation air stream through a recirculation air reprocessing device, and wherein said step c) comprises blowing said recirculation portion of said lower cabin exhaust air stream with a blower and passing said recirculation portion through a recirculation air reprocessing device.

7. The method of claim 1, further comprising cooling said upper cabin recirculation air stream before mixing said upper cabin recirculation air stream into said first and second supply air streams.

8. The method of claim 1, wherein said first and second supply air streams are separately tempered.

9. The method of claim 1, wherein said step a) comprises providing exactly two of said compressed air streams, and said step b) comprises cooling said two compressed air streams respectively in two of said air conditioning plants.

10. An apparatus for air conditioning an upper deck passenger cabin and a lower deck passenger cabin in a two-deck aircraft also having a below-deck space under said lower deck passenger cabin, comprising a compressed air source, at least one main air duct extending respectively from said source to said upper deck cabin and said lower deck cabin, at least one air conditioning unit interposed in said main air duct downstream from said source, at least one pre-mix chamber interposed in said main air duct downstream from said source, first and second local mixing chambers interposed respectively in said main air duct downstream from said source, an upper recirculation air duct connecting said upper deck cabin to recirculation air inlets of said first and second local mixing chambers, a lower cabin exhaust vent connecting said lower deck cabin to said below-deck space, a lower recirculation air duct connecting said below-deck space to recirculation air inlets of said pre-mix chamber, and an overboard exhaust vent selectively connecting said below-deck space to the environment outside said aircraft.

11. The apparatus of claim 10, wherein said pre-mix chamber is interposed in said main air duct downstream from said air conditioning unit, and said local mixing chambers are interposed in said main air duct respectively downstream from said pre-mix chamber.

12. The apparatus of claim 10, wherein said pre-mix chamber is arranged in said below-deck space, and said local mixing chambers are arranged between said upper deck cabin and said lower deck cabin.

13. The apparatus of claim 10, wherein said first and second local mixing chambers are provided in a local mixing unit having an airflow interconnection between said first and second local mixing chambers.

14. The apparatus of claim 10, further comprising conditioned air distributor ducts forming respective output ends of said main air duct and having respective pluralities of air inlets opening from said distributor ducts into said upper deck cabin and said lower deck cabin respectively.

15. The apparatus of claim 14, wherein said air inlets include ceiling inlets arranged near a ceiling and floor inlets arranged near a floor of said cabin decks, and further comprising air flow control valves arranged respectively in said distributor ducts and adapted to control the relative flow of air to said respective ceiling inlets and said respective floor inlets dependent on temperatures and existing thermal loads.

16. The apparatus of claim 10, further comprising respective recirculation air reprocessing devices and respective recirculation air blowers interposed in said upper recirculation air duct and said lower recirculation air duct.

17. The apparatus of claim 16, wherein said recirculation air blower interposed in said upper recirculation air duct is adapted to deliver an air flow rate from said upper deck cabin to said first and second local mixing chambers substantially equivalent to an air flow rate delivered from said first local mixing chamber to said upper deck cabin.

18. The apparatus of claim 10, further comprising a heat exchanger interposed in said upper recirculation air duct, and at least one cooling plant connected to said heat exchanger by coolant conduits.

19. The apparatus of claim 10, expressly excluding any exhaust air vent duct directly connecting said upper deck cabin to said environment outside said aircraft and expressly excluding any exhaust air vent duct directly connecting said upper deck cabin to said below-deck space.

20. The apparatus of claim 10, comprising a plurality of said pre-mix chambers and a plurality of said lower recirculation air ducts, which independently connect said below-deck space to respective ones of said pre-mix chambers.

21. The apparatus of claim 10, comprising two of said main air ducts that respectively extend from said source to said upper deck cabin and to said lower deck cabin, two of said air conditioning units interposed respectively in said two main air ducts downstream from said source, and two of said pre-mix chambers interposed respectively in said two main air ducts downstream from said source.

* * * * *